United States Patent [19]

Shokoples

[11] 4,205,513
[45] Jun. 3, 1980

[54] GROUND-ROLLING FORWARDLY-DIRECTED ROTARY BALER

[76] Inventor: John Shokoples, Suite 3, 10965 - 106 St., Edmonton, Alberta, Canada

[21] Appl. No.: 930,572

[22] Filed: Aug. 3, 1978

[51] Int. Cl.² ............................................. A01D 39/00
[52] U.S. Cl. ...................................... 56/341; 56/343; 100/5
[58] Field of Search ................ 56/16.4, 341, 343, 342; 100/88, 5

[56] References Cited

U.S. PATENT DOCUMENTS

| | | | |
|---|---|---|---|
| 3,815,344 | 6/1974 | Kucera | 56/341 |
| 3,869,849 | 3/1975 | Ulrich | 56/343 |
| 3,968,632 | 7/1976 | Gaeddert et al. | 56/341 |
| 3,969,879 | 7/1976 | Seymour | 56/341 |
| 3,992,987 | 11/1976 | Sereg | 100/88 |
| 4,019,309 | 4/1977 | Lundell | 56/341 |
| 4,024,804 | 5/1977 | Hanson | 100/88 |
| 4,057,954 | 11/1977 | Mast | 56/341 |
| 4,150,614 | 4/1979 | Schwartz | 100/5 |

Primary Examiner—Russell R. Kinsey
Assistant Examiner—Paul J. Hirsch
Attorney, Agent, or Firm—Max L. Wymore; E. Peter Johnson

[57] ABSTRACT

A rotary baler is provided, front mounted on a self-propelled power unit, to ground roll cylindrical bales of fibrous material. A pick-up assembly at the rear of the baler lifts the fibrous material from the ground to engage a generally vertical rear belt assembly which moves the material upwardly. Rotating discs at the upper end of the rear belt assembly deflect the material forward to engage a forwardly extending upper belt assembly which biases the material forwardly. The upper belt assembly is pivotally mounted at its rear end so that it can rotate with the expansion of the forming bale. Flexible lengths of cable hang down forward of the upper belt assembly; these cables act to shape and contain the forward portion of the forming bale. A spring-biased arcuate arm assembly, positioned intermediate the upper belt assembly and the cables, guides and compresses the forming bale once it has reached a pre-determined size. A twine assembly at the front of the baler is actuated by contacting the surface of the rolling bale; the twine assembly automatically wraps the bale and cuts the twine as the formed bale is discharged from the baler.

23 Claims, 21 Drawing Figures

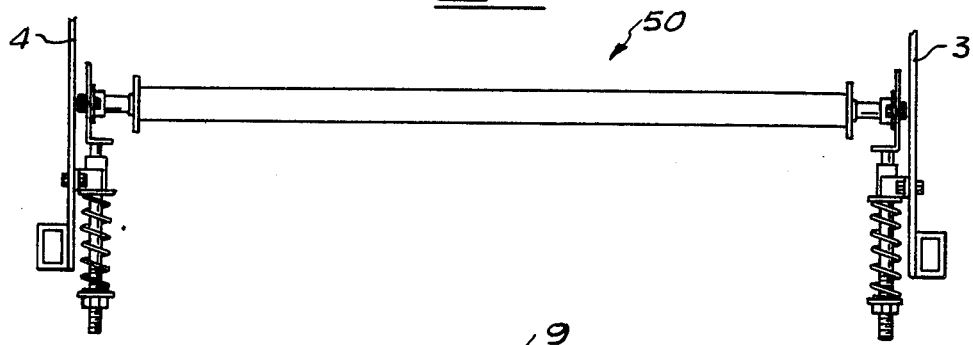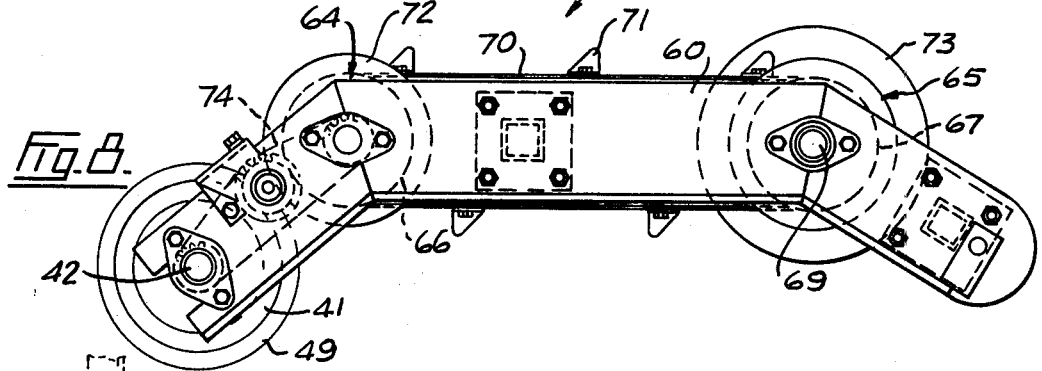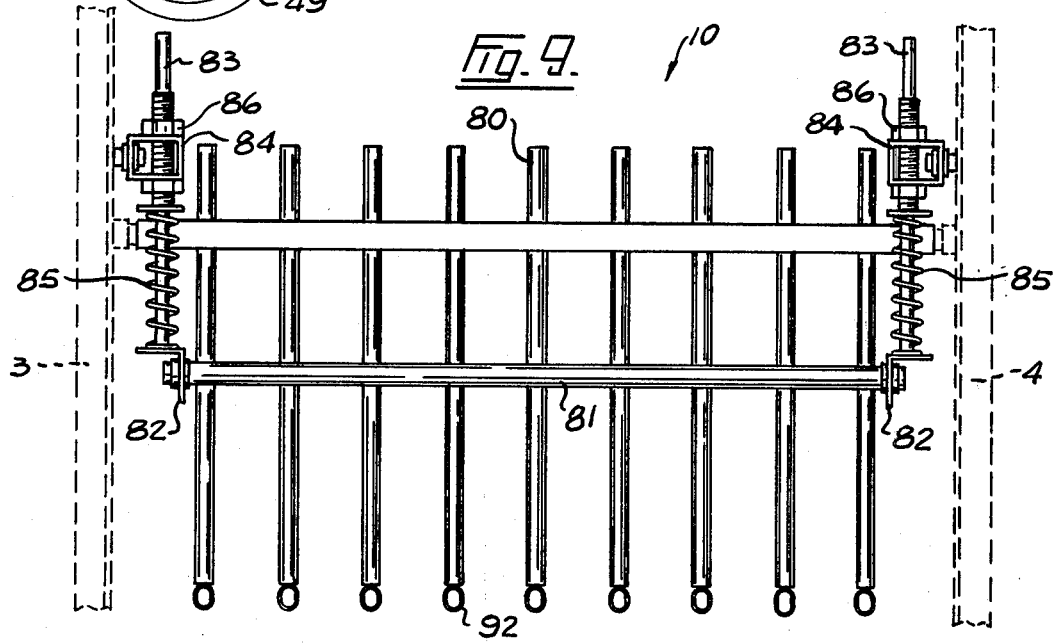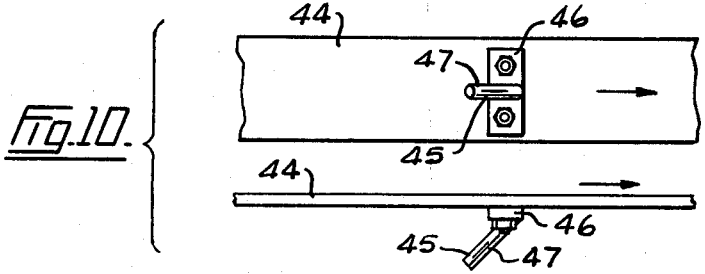

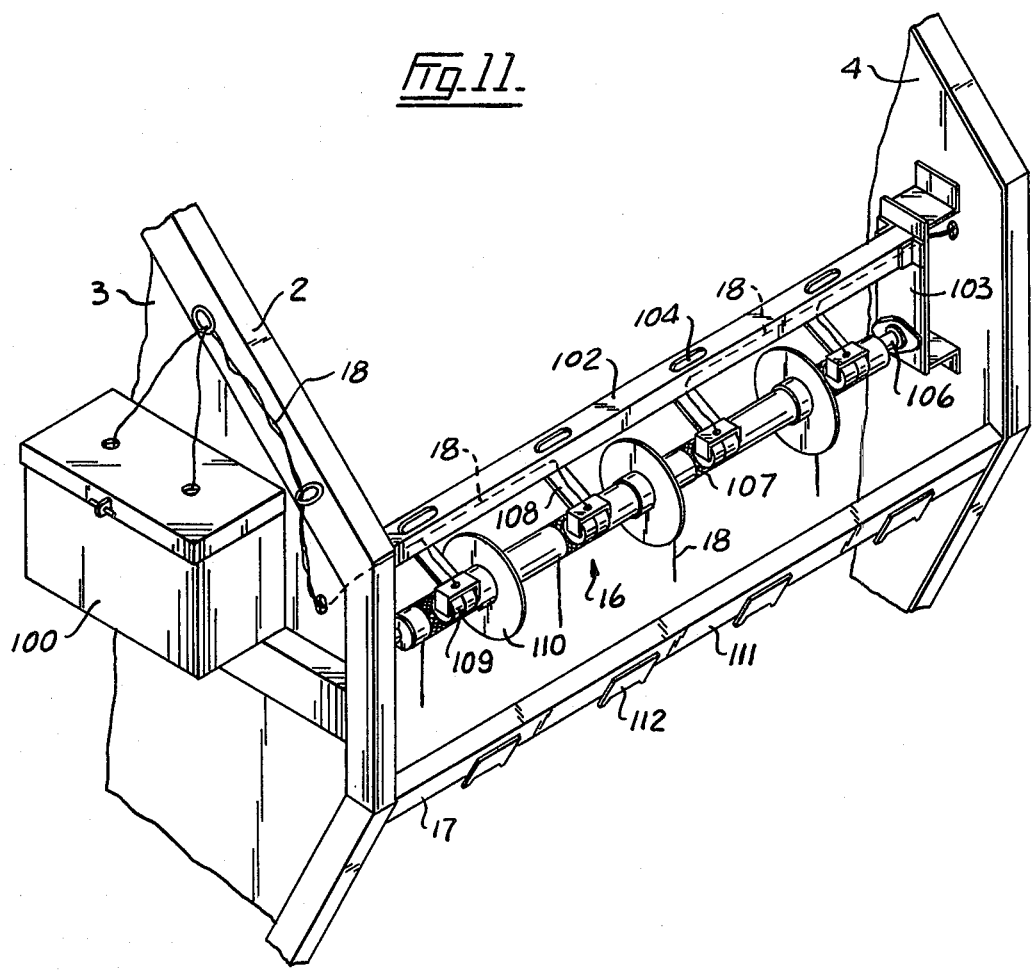
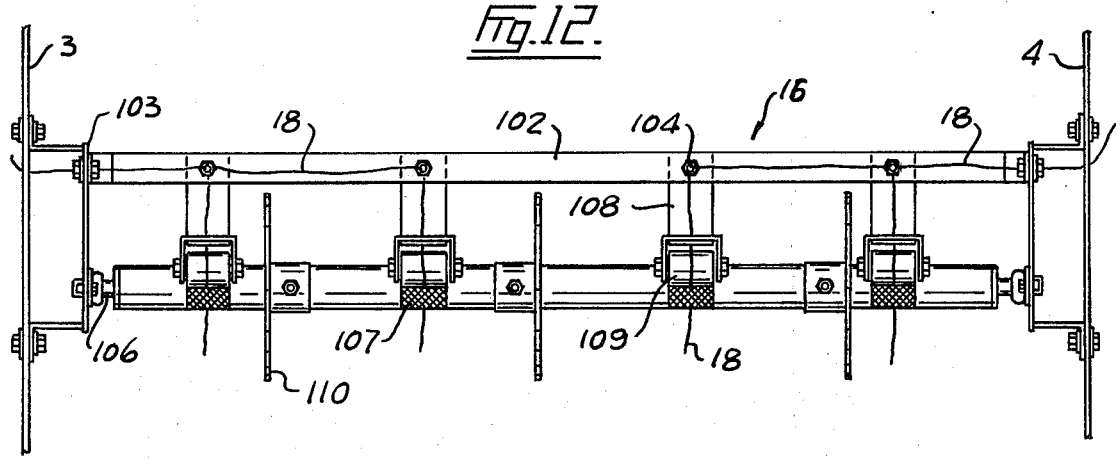

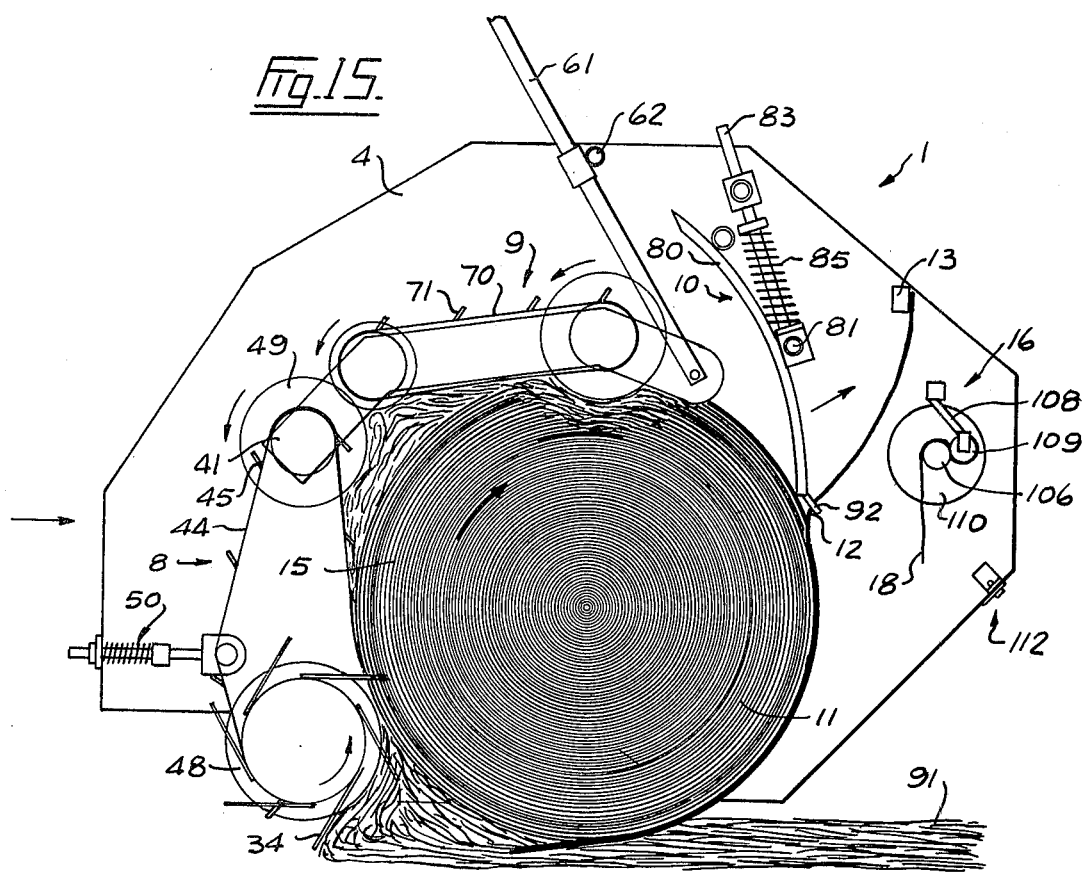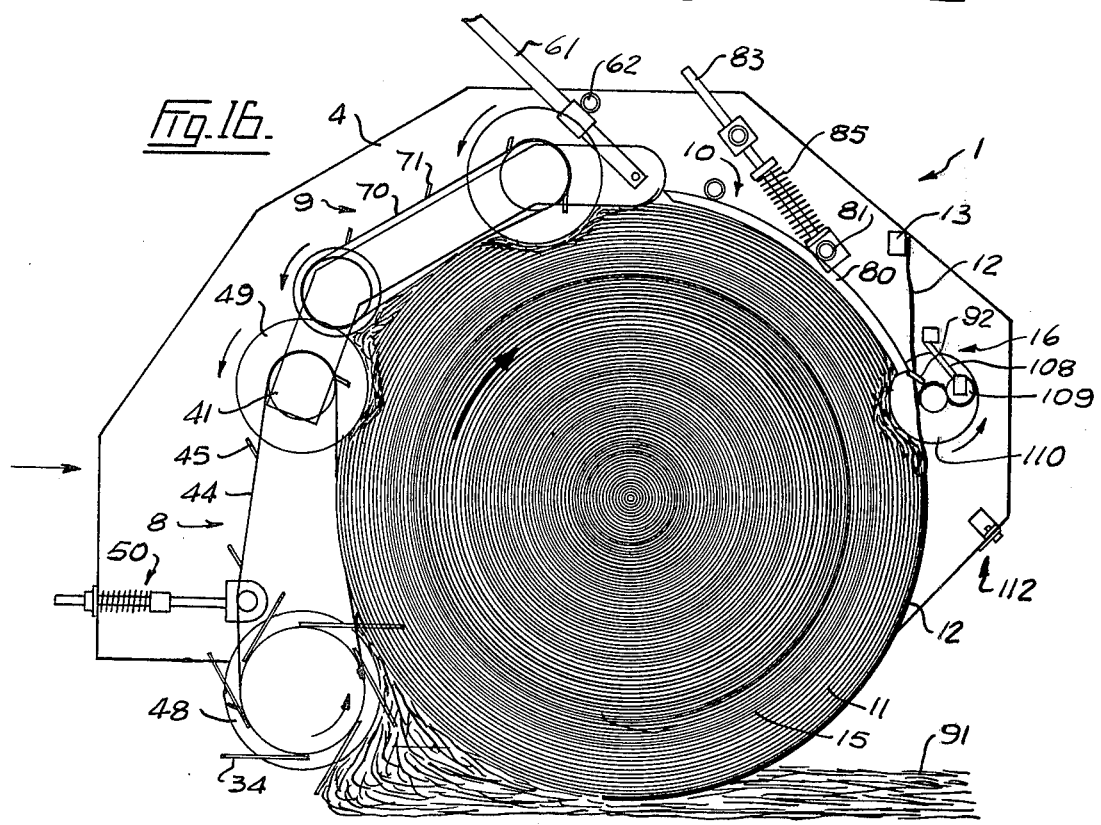

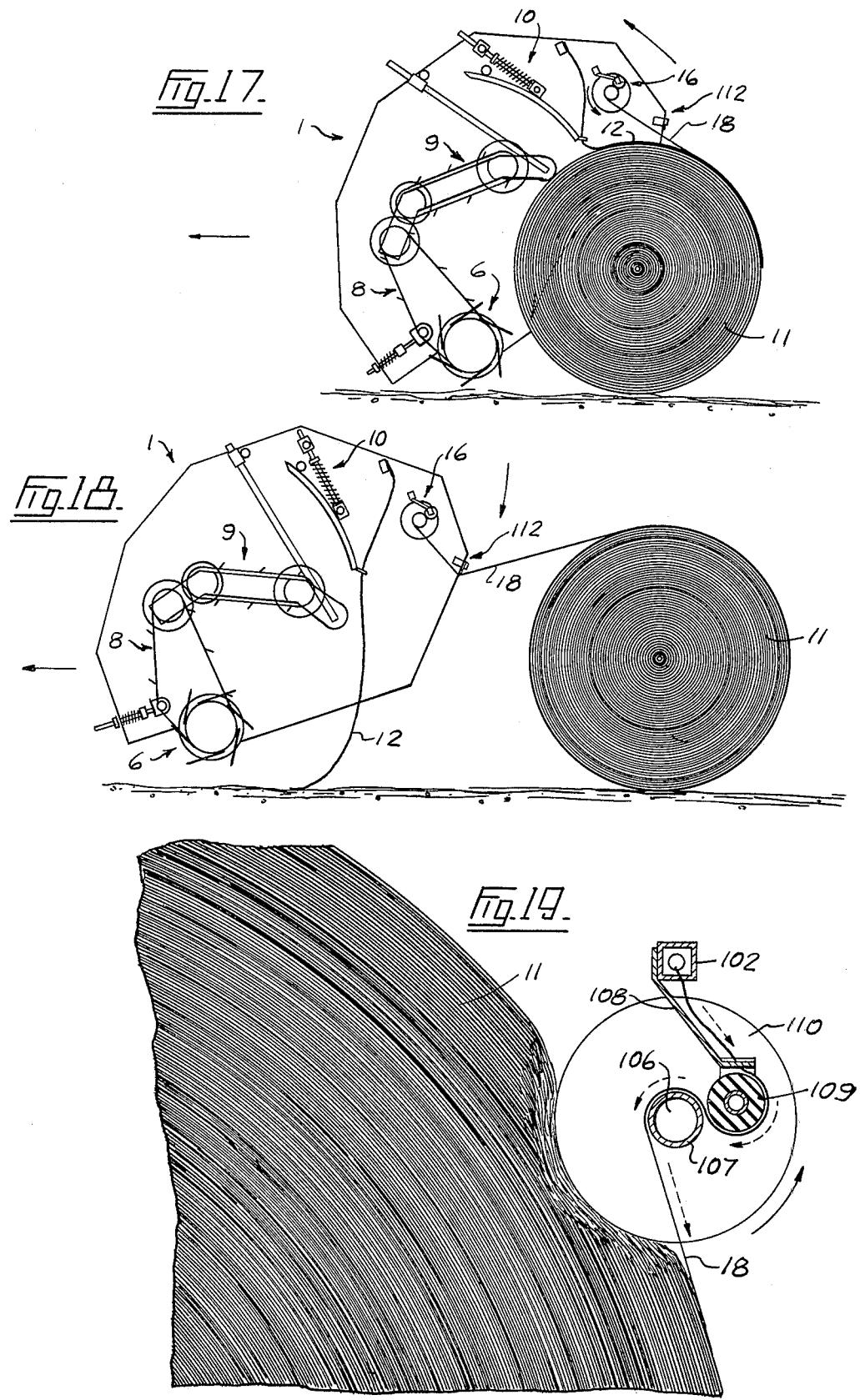

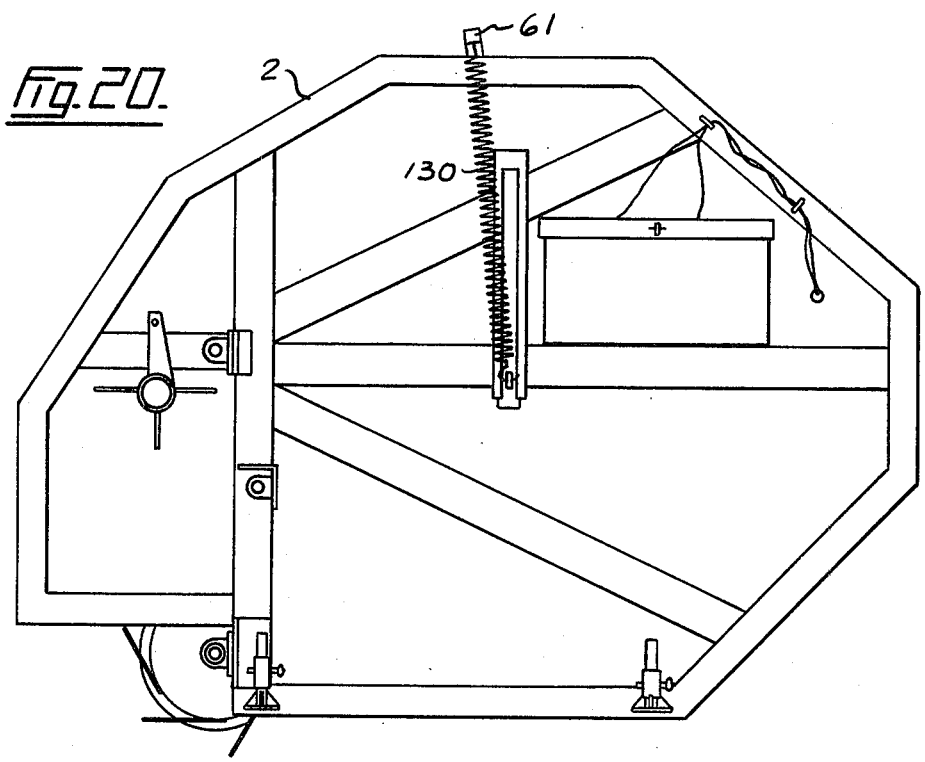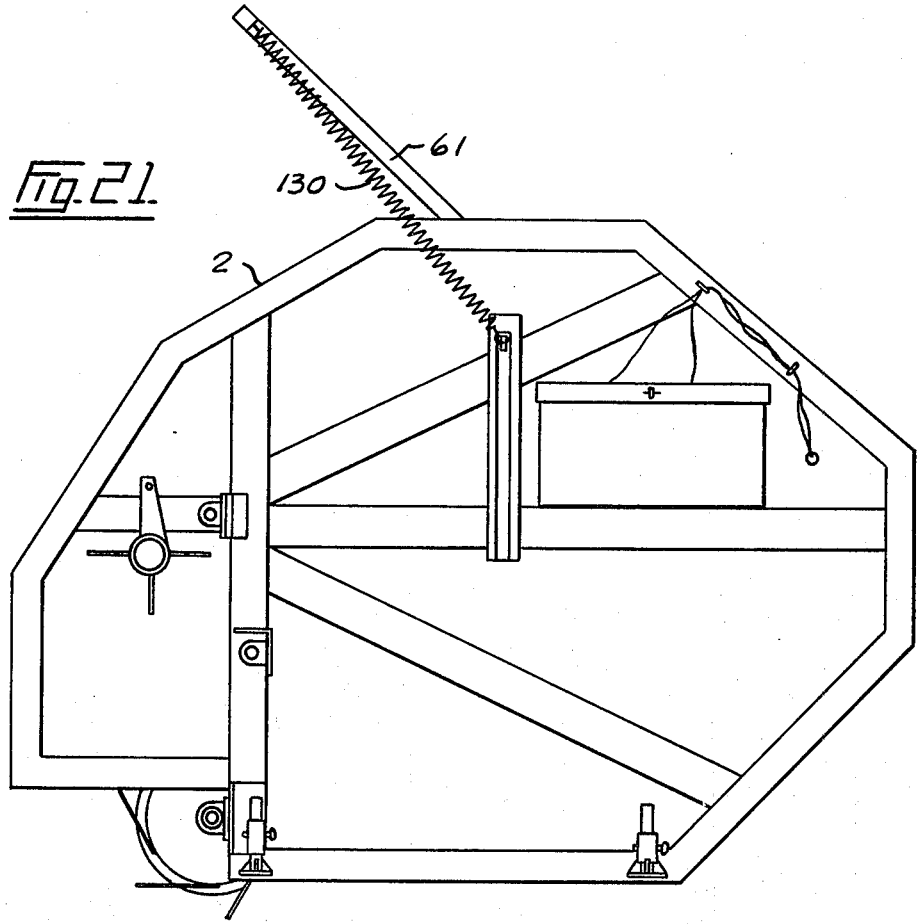

GROUND-ROLLING FORWARDLY-DIRECTED ROTARY BALER

BACKGROUND OF THE INVENTION

This invention relates to a forwardly-directed rotary baler for forming swathed hay or straw material into cylindrical bales, and in particular to a rotary baler of the type which rolls the material along the ground as the bale is being formed. The baler may be a separate unit which is mountable on the front of a wheeled power unit to form a self-propelled assembly, or the baler may be integral with the power means, thereby providing a self-propelled unit. This type of machine is termed a ground-rolling forwardly-directed rotary baler.

In general, the commercially successful rotary balers pick up the swath material and introduce it into a hollow cylindrical chamber defined by a system of moving belts. The belts extend around and enclose almost the entire circumference of the forming bale. They expand against applied tension as the bale is growing in size and presses outwardly against them. The belts act to move and guide the material along an arcuate path, thereby forming it into a cylindrical bale. The circumferential speed of the belts is greater than the ground speed of the baler—thus the bale is continually spun at a relatively high rate with a view to increasing its density. This type of machine is termed herein a full circumference belt baler.

These prior art balers are characterized by a number of problems. For example, they are pull type units—that is, they are pulled by a power unit, such as a tractor—as a result, the operator has a poor view of the swath being worked on. The relatively rapid spinning of the forming bale tends to cause undesirable leaf loss and shattering damage to the hay or straw material. Since the tractor precedes the baler, and since it is necessary for the tractor to move on and off the swath as it is maneuvered (to feed the swath onto the bale in a manner which produces a bale of constant diameter), there is considerable leaf shatter arising from the grinding action of the tractor wheels. Most of this shattered leaf material, which has a valuable protein content, is not incorporated in the bale. The machines are characterized by having narrow inlets for the incoming swath material—such inlets commonly involve a pair of compressing rolls; the narrowness of these inlets influences the thickness of the swath that can be accommodated, thereby slowing the rate of advance of the machine and thus its baling rate. The bale, being completely enclosed in belts, is not easily accessible in the event that the operator should need to clear piled-up material from the bale-forming zone. The machines which are available do not have a fully automatic twine wrapping and cutting mechanism which the operator can use without stopping the machine and manually engaging in succession the wrapping and cutting mechanisms. Because the entire weight of the bale is carried by the baler, the latter's construction must be particularly strong. For this reason and the need for the extensive driven belt system, the available machines are mechanically complicated and therefore are expensive to buy and operate, as well as being somewhat hazardous to use.

There has also been proposed in the prior art the combination of the concepts of forwardly directing the baler (to enable the operator to see the swath stretching before him) and ground rolling the bale during its formation (to reduce the complexity and extent of the belt system and thus the cost of the baler). This is, for example, shown in U.S. Pat. No. 3,815,344, issued to Kucera. However, up until now, no such unit has been developed which confines the front lower circumferential surface of the bale being formed. Thus there is undesirable spilling, piling up and skidding of the hay or straw through this gap. To my knowledge, no one has heretofore provided a ground-rolling forwardly-directed rotary baler having sufficiently complete circumferential enclosure of the growing bale so as to eliminate the spilling problem and thereby duplicate the mechanical control over the bale which is inherent in the commercially successful full circumference belt balers.

SUMMARY OF THE INVENTION

In accordance with a broad aspect of the invention, there is provided a ground-rolling forwardly-directed rotary baler having passive means for confining the front lower circumferential surface of the bale being formed, said means being adapted to permit the baler to be backed away from the bale when the latter is to be discharged. More particularly, said means comprise a plurality of flexible elements, preferably transversely spaced steel cable lengths hanging freely at the front entrance of the bale-forming zone, which elements are of sufficient length so that their free lower ends become trapped between the forming bale and the ground. With one end trapped beneath the bale and the other end fixed to the frame, the flexible elements provide a tightly confining curved framework at the front surface of the forming bale. When the bale is to be discharged, the baler is simply backed away from the bale and the cable lengths slip easily back over the stationary bale and release it.

In accordance with another broad aspect of the invention, there is provided a ground-rolling forwardly-directed rotary baler having novel driven biasing and forming means. Such means include means, such as a pick-up drum assembly, for lifting the fibrous material from the ground, an upright rear belt assembly, for receiving the lifted fibrous material from the pick-up drum assembly and moving and guiding said material upwardly, and an upper belt assembly for receiving the material from the rear belt assembly and moving and guiding it forwardly. The upper belt assembly is pivotally mounted at its rear end to permit it to rotate therearound in a vertical plane. The pivoting capability of the upper belt assembly permits it to assume a downwardly angled position relative to the upright rear belt assembly in the early stages of bale formation—thus a considerable proportion of the circumferential surface of the forming bale is acted on by the belt assemblies during this early formative period. As the bale grows, the upper belt assembly is forced to pivot upwardly until the belt assemblies together engage a reduced proportion of the bale's circumferential surface.

In a preferred form of the invention, the two broad aspects of the invention previously described are combined. That is, there is provided a combination of "active" (i.e. positively engaging and biasing) and "passive" (i.e. non-biasing) components which together extend around substantially all of the circumferential bale surface which is out of contact with the ground, after the bale has first gone through an initial core-forming stage. More particularly, a frame is provided having interconnected, parallel, spaced side members. The pick-up drum assembly is rotatably carried by the frame at its lower rear end. The rear and upper belt assemblies are also carried by the frame and extend upwardly from the pick-up drum assembly and then forwardly respectively. The assemblies are all driven or rotated. Preferably, this is done by driving one assembly and interconnecting the others to it. The cables hang downwardly from a transverse beam, extending between the frame side members, positioned at a point forward of the upper belt assembly. In an initial core-forming stage, the swath material is lifted by the pick-up drum assembly and fed to the rear belt assembly. This assembly raises it upwardly but, being unconfined, it tumbles forwardly onto the trailing ends of the cables, which direct it downwardly and rearwardly. As new material is incorporated, a loose roll is developed. In short order, the roll reaches a size at which it contacts the upper belt assembly. At this stage, the bale is being engaged by the three active components (which are generally arranged in an open-bottomed, somewhat triangular configuration) over the greatest part of that portion of its circumferential surface which is out of contact with the ground. The cables and the ground confine and guide or form the remaining portion of the bale. The active components therefore function to move and guide the material upwardly and forwardly; the passive component, i.e. the cable framework, acts to confine and guide the material downwardly and rearwardly to the ground. As the bale continues to grow, the upper belt assembly pivots upwardly and the cables come into contact with a proportionately larger portion of the bale surface.

It should be understood that when the phrase "substantially all" was used at the beginning of the preceding paragraph to describe the extent of circumferential enclosure, it is to be given a generous interpretation—there are gaps between the components and the enclosure is not complete. However, it will be noted that the most troublesome gap—that at the front lower section of the bale—is closed by the cables.

In the preferred feature, a spring-loaded arcuate arm assembly is positioned between the upper belt assembly and the cables. This passive assembly functions to guide and compress the material. It only comes into play once the bale has reached a considerable size and there is a desire to put a dense outer coat on it. Because the spring is adjustable, the degree of compaction incurred by the pressure of this assembly against the surface of the growing bale can be varied.

In another preferred feature, backwardly slanted teeth or "cogs" are provided on the working faces of the belts of the belt assemblies. These cogs positively engage the hay or straw and assist in the rotation of the bale. However, because of their backward slant, they provide desirable slippage. The belts themselves also provide slippage. In this manner, the baler can accommodate differentials in speed between belt movement and the advance of the baler along the ground.

In another preferred feature, deflecting means are provided at the upper end of the rear belt assembly and the forward end of the upper belt assembly to disengage the fibrous material from the belts and re-direct it in the desired direction. Such means may be large discs which are rotated so that they clear themselves of hay or straw.

In another broad aspect of the invention, there is provided a twine assembly adapted to be automatically actuated by the bale itself, once the bale has reached a pre-determined size. More particularly, means are provided which, when contacted by the rotating growing bale, are themselves rotated to pay out the twine immediately in front of the bale. The twine becomes trapped between the swath material and the bale and becomes incorporated with the bale material. It is then the rotation of the bale which pulls out further twine until the bale is suitably wrapped. Means are provided for automatically severing the twine when this stage is reached.

Broadly stated, the invention is a forwardly-directed ground-rolling rotary baler comprising: a frame; means carried by the frame for lifting fibrous material from the ground and moving and guiding it upwardly and forwardly so that the material is biased along a generally arcuate path; and passive flexible means having an upper end attached to the frame and a free lower end which becomes trapped between the forming bale and the ground, said passive flexible means receiving the material from said means and confining it while guiding it in a downward and rearward direction; said combination of means being operative to form said fibrous material into a ground-supported cylindrical bale.

The invention also broadly contemplates a method of forming a cylindrical bale from a swath of fibrous material comprising: lifting fibrous material upward from the ground; moving and guiding the material upwardly and then forwardly with belt means; then flexibly confining the material as it drops with passive flexible means which become trapped between the forming bale and the ground, so that the material is downwardly and rearwardly directed, until the material completes a rotation and engages the remaining swath, whereby the bale is gradually formed as further fibrous material is added in this manner by a combination of active and passive mechanical parts.

One construction of a baler in accordance with the invention will now be described, by way of example only, reference being made to the drawings.

DESCRIPTION OF THE DRAWINGS

FIG. 7 is a top perspective view of the spring loaded belt tightener rod assembly of the vertical rear belt assembly.

FIG. 8 is a side view of a carrier arm of the upper belt assembly.

FIG. 9 is a top view of the arcuate arm assembly of FIG. 4.

FIG. 10 is a composite figure showing plan and side views of the material engaging cogs, showing attachment to the working surface of the belt.

FIG. 11 is a fragmentary perspective front view of the twine assembly of FIG. 4.

FIG. 12 is a top view of the twine assembly of the FIG. 11.

FIGS. 13–18 show progressive steps during the formation of the rolled bale.

FIG. 13 is a side view of the rotary baler in the initial core-forming position.

FIG. 14 is a side view of the rotary baler with the forming bale in the confines of the ground, belt assemblies and flexible elements.

FIG. 15 is as FIG. 14 with the bale circumference extended to hold the upper belt assembly in an upward position and contacting the forward end of the arcuate arm assembly to initiate its participation in the bale formation.

FIG. 16 is a side view of the rotary baler as the bale has reached a size to actuate the twine assembly—the arcuate arm assembly is in operation.

FIG. 17 shows the rotary baler in an upraised discharge position to release the wrapped bale.

FIG. 18 shows the baler after it has been backed away and is being pivoted downwardly to cut the twine held taut between the released bale and the rotary baler.

FIG. 19 is an enlarged side view of the twine assembly.

FIG. 20–21 are side views showing the incorporation of springs to assist in pressing the upper belt assembly downwardly to increase densification of the forming bale.

PREFERRED EMBODIMENT OF THE INVENTION

GENERAL ARRANGEMENT AND OPERATION

Figure 1:
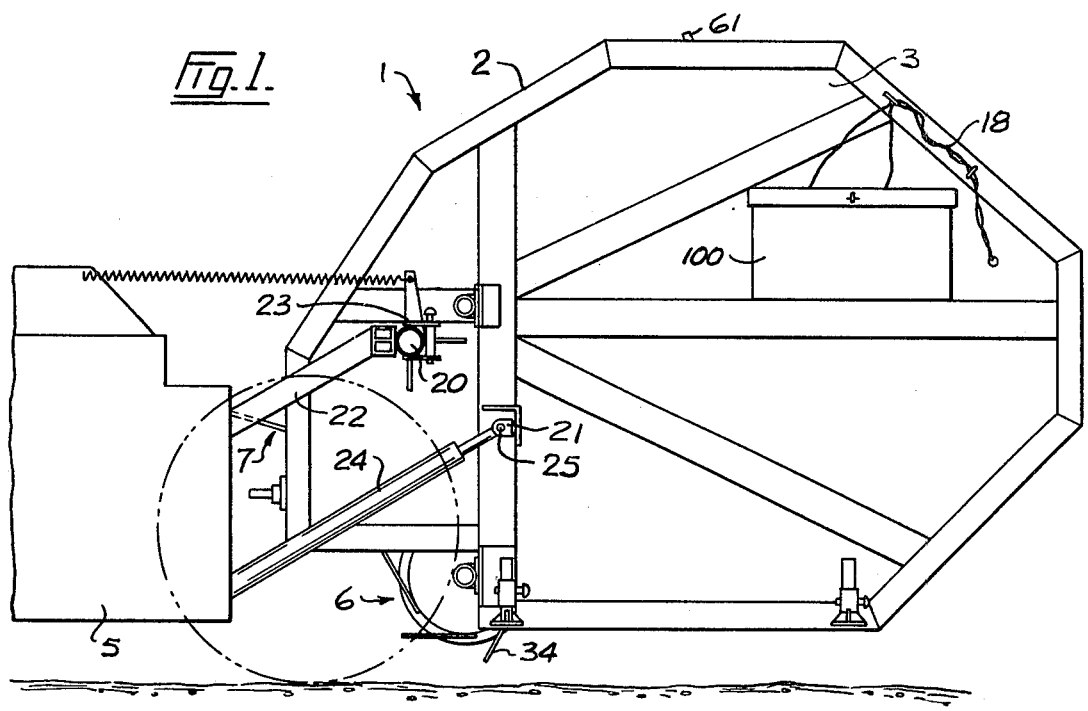
FIG. 1 is a side view of the rotary baler in a horizontal operating position in connection to the power unit.
Figure 2:
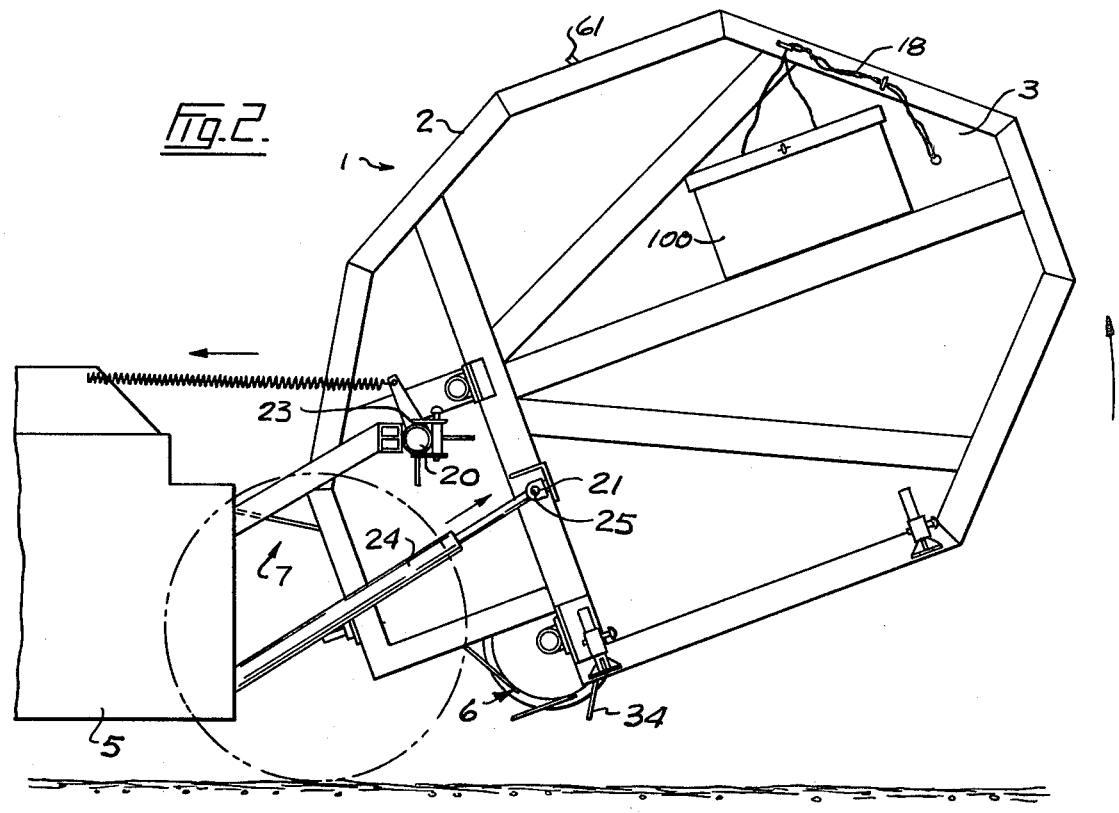
FIG. 2 is a side view of the rotary baler in an upraised discharge position in connection to the power unit.

With reference to the Figures, there is shown a rotary baler 1. The baler 1 includes a frame 2 having spaced parallel side members 3,4 interconnected by transverse members 113. The frame 2 is pivotally mountable on a power unit 5 for movement between operating and discharge positions. These positions are illustrated in FIGS. 1 and 2 respectively. A pick-up drum assembly 6 is rotatably mounted on the lower rear end of the frame 2. This pick-up assembly 6 is driven in a counterclockwise direction by the power take-off assembly 7 of the power unit 5 and functions to lift the swathed hay or straw from the ground. A generally vertical rear belt assembly 8 is carried by the frame 2 and is positioned above the pick-up assembly 6. This rear belt assembly 8 is drivably interconnected with the pick-up assembly 6 so that it too moves in a counterclockwise direction. The rear belt assembly 8 receives the swathed material from the pick-up assembly 6 and moves and guidies it upwardly. An upper belt assembly 9 is suspended from the frame 2 in a suitable manner so that it can pivot in a vertical plane about its rear end. This upper belt assembly 9 is drivably interconnected with the rear belt assembly 8 so that it too rotates in a counterclockwise direction; it moves and guides the swathed material forwardly. The two belt assemblies 8,9 combine to move and guide the material along a generally arcuate path. In the early stages of bale development, the upper belt assembly 9 is operative to move and guide the material along a forwardly and downwardly directed path, but gradually pivots so that, in the late stages of bale development, it is operative to move and guide the material along the forwardly and upwardly directed path. An arcuate arm assembly 10 is pivotally mounted on the frame 2 forward of the upper belt assembly 9. The spring-loaded arcuate arm assembly 10 engages the forming bale 11 when it has reached a pre-determined size and is operative to compress and guide the bale to assist in its formation and densificaton. A plurality of flexible elements 12, which are shown as discrete lengths of steel cable, are suspended at their upper ends from a transverse beam 13 extending between the frame side members 3,4. The cables 12 hang freely in transversely spaced arrangement across and adjacent to the front entrance 14 of a bale-forming zone 15 located within the frame 2. The cables 12 are of sufficient length so that their free lower ends become trapped between the growing bale 11 and the ground; when this occurs, they adopt a tensioned, curved state against the circumferencial surface of the bale and are operative to passively guide and form that portion of the bale against which they press. A twine assembly 16 is provided for automatically wrapping the bale 11 with twine lengths 18 once the bale has reached a pre-determined size. A cutting bar 17, which is brought into play when the frame 2 is pivoted to the discharge position, acts to sever the twine.

THE FRAME AND ITS CONNECTION WITH THE POWER UNIT

As previously stated, the frame 2 comprises a pair of flat, wall-like side members 3,4 maintained in spaced-apart, parallel relationship by a plurality of transverse members 113.

Each side member 3,4 carries means for pivotally connecting it with the power unit 5. More specifically, each side member 3,4 has a stub shaft 20, extending outwardly from the rear end of said side member, and a yoke 21 mounted on the side member forwardly and below the stub shaft 20. As shown in FIGS. 1 and 2, a pair of rigid arms 22 extending forwardly from the power unit 5 are each pivotally secured to one of the stub shafts 20 by a saddle assembly 23. By pivotally secured is meant that the saddle assemblies 23 can rotate on the stub shafts 20. A pair of hydraulic cylinders 24 also extend forwardly from the power unit 5 and each cylinder is pivotally connected by a pin 25 to one of the yokes 21. Thus, expansion of the hydraulic cylinders 24 causes the frame 2 to rotate in a counterclockwise direction about the stub shaft connections with the rigid arms 22 between a horizontal operating position (FIG. 1) and an upraised discharge position (FIG. 2).

The frame 2 is shown separable from and pivotally mounted on the front of the power unit 5, such as is commonly used with a swather header (not shown) for swathing. It will be appreciated that the power unit and baler can be combined to provide a single integral machine. In both cases a self-propelled, forwardly-directed baler is the result.

THE PICK-UP DRUM ASSEMBLY

A conventional pick-up drum assembly 6 is rotatably mounted on the lower rear end of the frame 2. The pick-up drum assembly comprises a drum 30 rigidly fixed to a shaft 31. The shaft 31 is rotatably journalled in bearings 32 carried by the side members 3,4.

A sprocket and chain assembly 33 mounted on the frame 2 provides a drive connection between the power take-off assembly 7 of the power unit 5 and the drum shaft 31. Thus the drum 30 can be driven in a counterclockwise direction. The drive connection is shown schematically in FIG. 5.

The pick-up drum 30 has flat, fairly rigid, spring steel pick-up teeth 34 spaced around its circumference in rows 35. The rows 35 are spaced along the axis of the drum 30. When the drum 30 is rotated, the teeth 34 are operative to lift or pick up swathed fibrous material, namely hay or straw, from the ground.

THE VERTICAL REAR BELT ASSEMBLY

Figure 3:
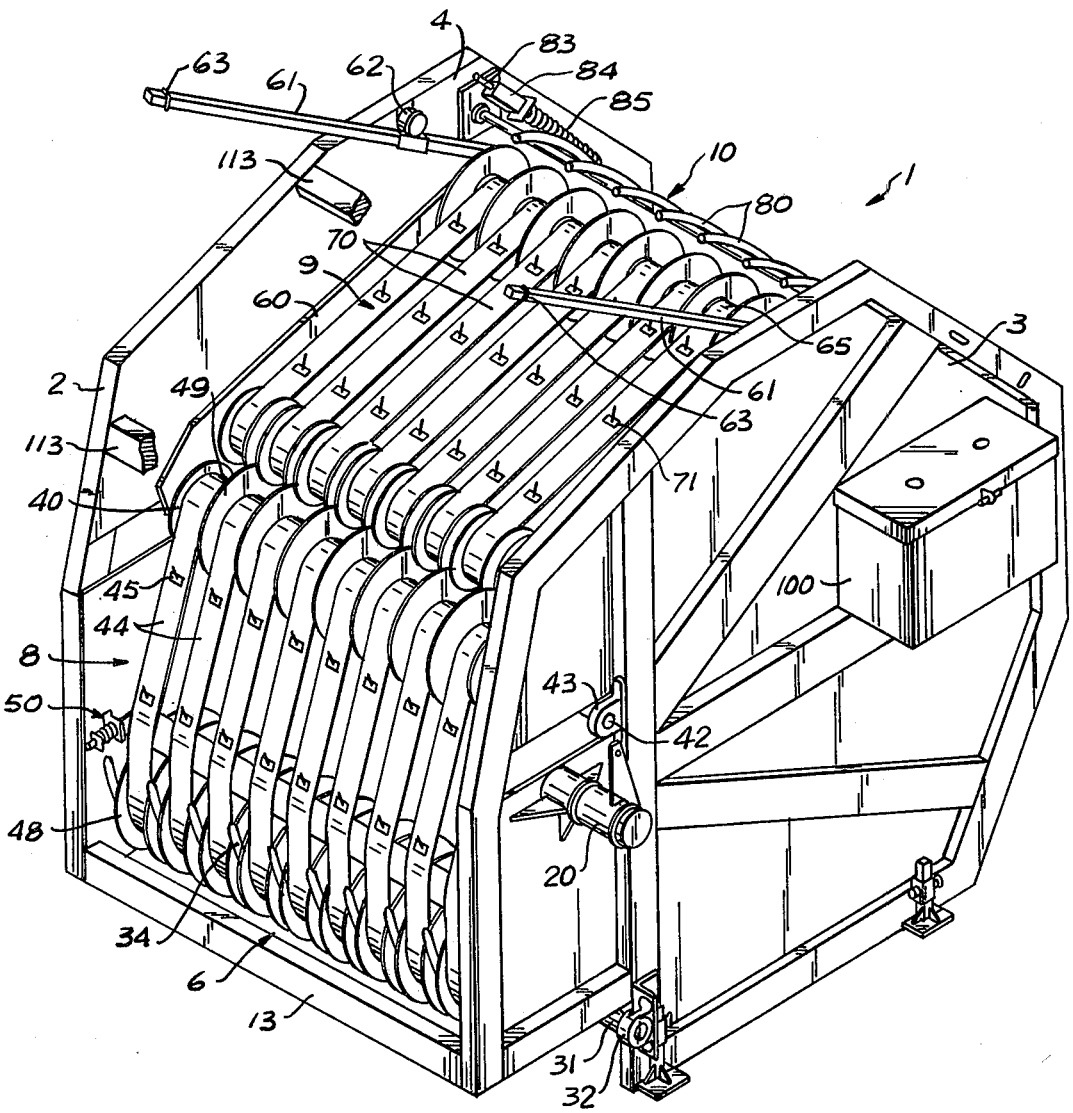
FIG. 3 is a rear perspective view of the rotary baler showing the frame, the pick-up assembly and belt assemblies.
Figure 6:
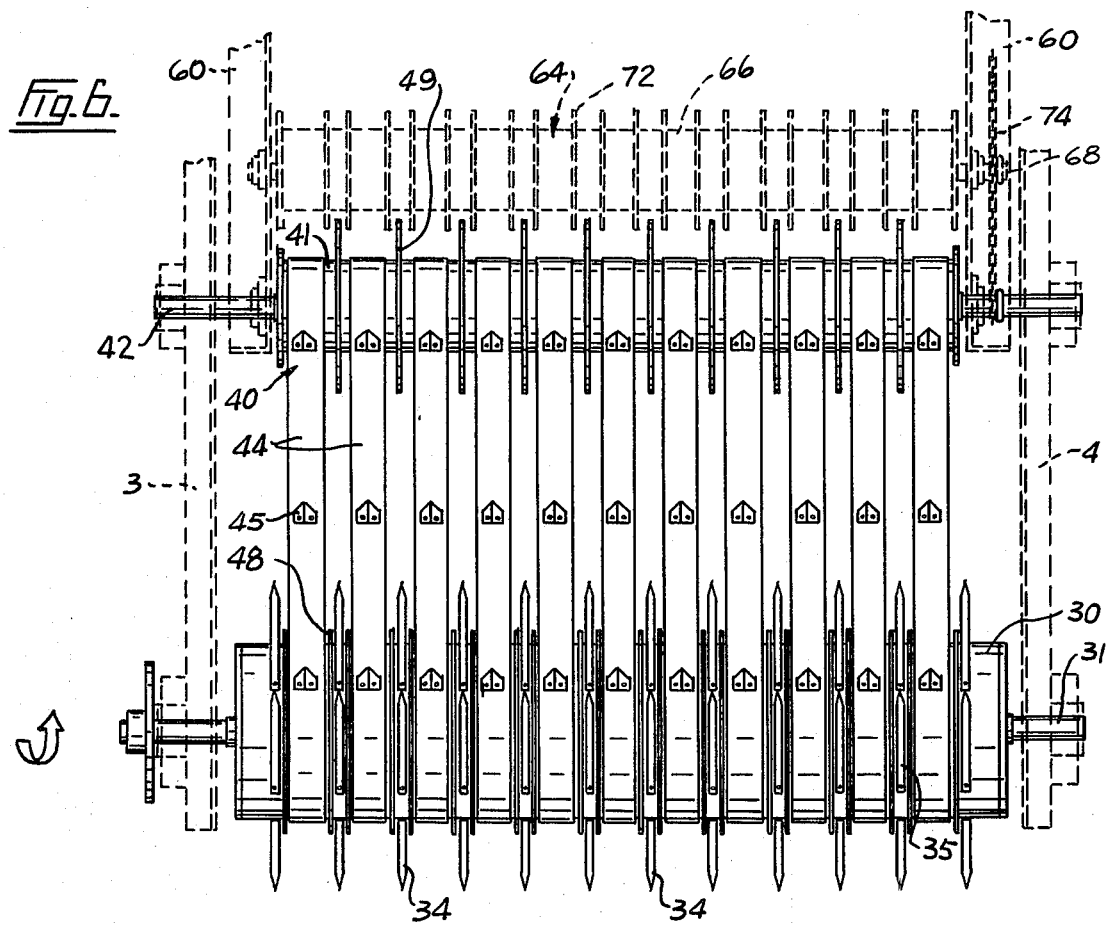
FIG. 6 is a rear view of the pick-up assembly and vertical rear belt assembly.

As shown in FIGS. 3 and 6, a generally vertical rear belt assembly 8 is positioned above the pick-up drum assembly 6. This rear belt assembly 8 comprises an upper roller unit 40, having a roller 41 attached to a shaft 42. The shaft 42 extends transversely between the frame side members 3,4 and is rotatably journalled in bearings 43 attached to said members.

A series of endless belts 44 extend around the pick-up drum 30 and the roller 41. Thus rotation of the pick-up drum 30 biases the belts 44 in a counterclockwise direction and rotates the upper roller unit 40. The belts 44 are spaced along the axes of the drum 30 and roller 41.

Each belt 44 carries fibrous material-engaging cogs 45 on its outer or working surface. The cogs 45 are spaced at intervals along the length of the belt 44. Each cog 45 comprises a flat plate 46, secured to the belt 44, having a backwardly slanted finger 47, which may have a length of $2\frac{1}{4}''$, inclined at an angle of approximately 45° (see FIG. 10). The fingers 47 are each inclined in a direction opposite to the direction of travel of the belt with which it is associated. They are designed to engage the hay or straw, whether it is still loose or has become bound in to the bale, and move it in the direction of belt movement.

A series of discs 48 are axially spaced along the pick-up drum 30. Similarly, a series of discs 49 are axially spaced along the upper roller 41. The discs 48, 49 function to train the belts 44. In addition, the discs 49, which are relatively large in diameter compared to the belt-training discs 48, also function to hide the cogs 45, so that they release the engaged fibrous material, and to deflect the upwardly moving fibrous material and help change its direction of movement to a forward one, so that the material will engage the upper belt assembly 9.

A conventional adjustable spring-loaded belt tightener rod assembly 50 is secured to the frame 2, as shown in FIGS. 3 and 7, to control the tensions of the belts 44.

THE UPPER BELT ASSEMBLY

The upper belt assembly 9 extends forwardly from the upper roller 41 of the rear belt assembly 8.

The upper belt assembly 9, partly shown in FIG. 8, comprises a pair of spaced, parallel carrier arms 60 which are pivotally mounted at their rear ends on bearings circumscribing the upper roller shaft 42. The carrier arms 60 are suspended at their front ends by a pair of hanger arms 61. The hanger arms 61 extend through ring-like guides 62 and are slidable therethrough. The guides 62 are pivotally mounted on the frame side members 3,4 so that they can rotate through the positions shown in FIGS. 13-18. Stops 63 on the hanger arms 61 limit the downward movement of the arms through the guides 62.

Rear and front roller units 64, 65 are positioned at the ends of the carrier arms 60. Each such roller unit comprises a roller 66, 67 mounted on a shaft 68, 69; the shafts extend transversely between and are rotatably journalled in the carrier arms 60.

A series of endless belts 70, similar to the belts 44, extend around the rear and front roller units 64, 65. The belts 70 also carry cogs 71, similar to the cogs 45, spaced along their working surfaces.

A series of discs 72, 73 are spaced along the length of each of the rollers 66, 67. The discs 72 are interweaved with the deflector discs 46 of the upper roller 41—said discs 72 function to train the belts 70. The larger discs 73 function to train the belts 70 at the other end and also operate to deflect the fibrous material downwardly.

Figure 5:
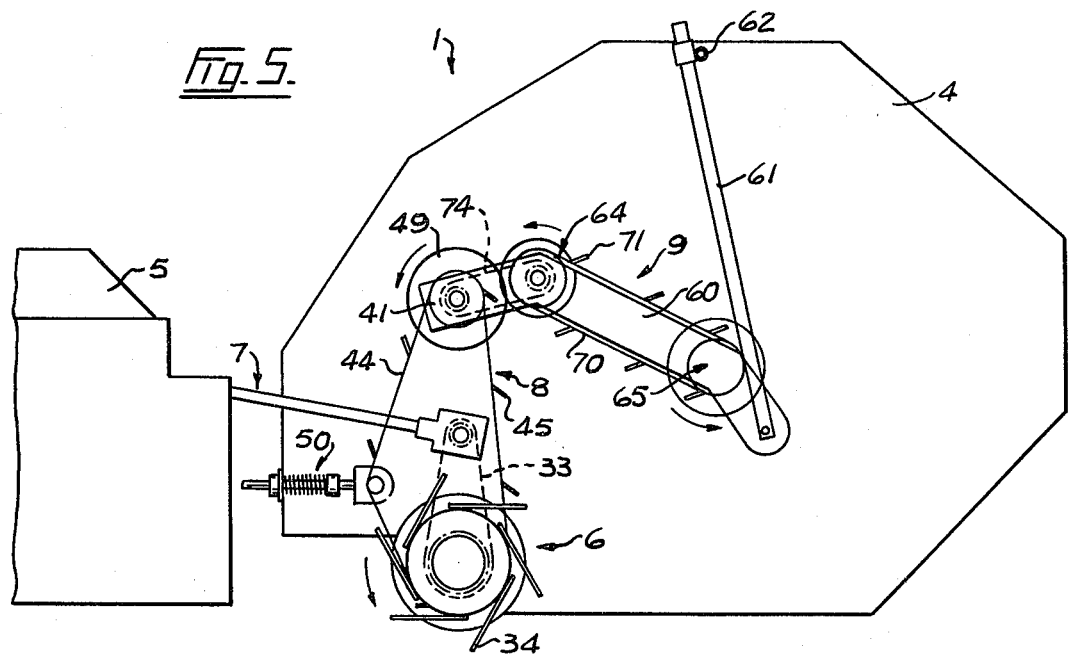
FIG. 5 is a side view of the rotary baler with schematic representation of the connections to the power unit for actuation of the baler.

A sprocket and chain assembly 74, shown schematically in FIG. 5, is carried by the carrier arms 60 and extends between the upper roller unit 40 of the rear belt assembly 8 and the rear roller unit 64 of the upper belt assembly 9. This sprocket and chain assembly 74 drives the roller unit 64 and thereby biases the belts 70.

The upper belt assembly 9 thus provides a driven belt system which can pivot downwardly about its rear pivot point, to an extent limited by the hanger arm stops 63, and can pivot upwardly by riding on the growing bale. The degree of pressure with which the upper belt assembly 9 acts on the bale 11 can be increased by incorporating springs 130, connecting the hanger arms 61 and frame 2, as shown in FIGS. 20-21.

The pick-up drum rear and upper belt assemblies 6, 8, 9 combine to provide means, carried by the frame 2 and connectable to the power unit 5 for actuation thereby, for lifting fibrous material from the ground and moving and guiding it upwardly and forwardly so that the material is biased along a generally arcuate path.

THE ARCUATE ARM ASSEMBLY

Figure 4:
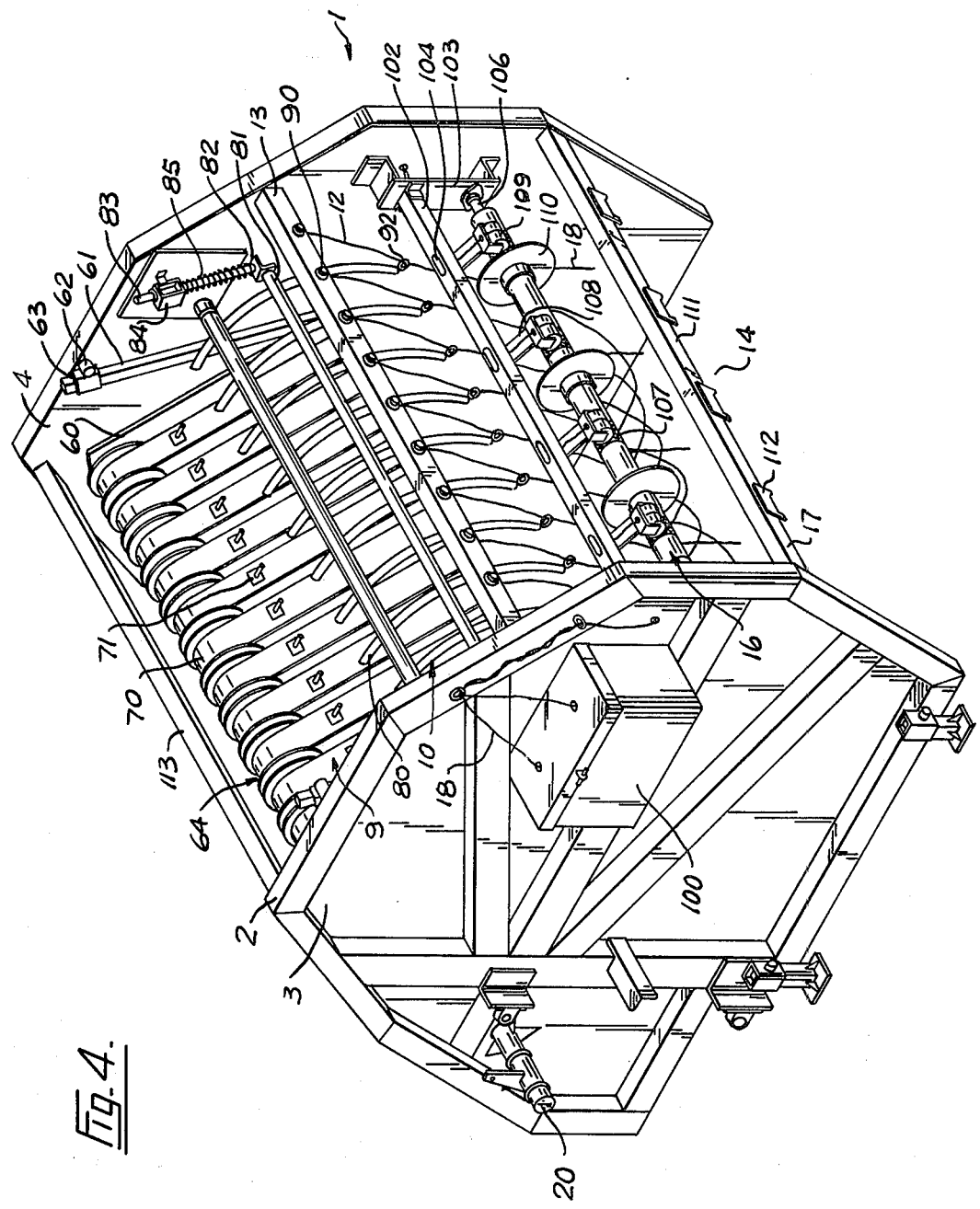
FIG. 4 is a front perspective view of the baler showing the arcuate arm assembly, flexible elements and twine assembly.

With reference to FIGS. 4 and 9, an arcuate arm assembly 10 is mounted on the frame 2 for acting on the bale surface as it leaves the upper belt assembly 9. This assembly 10 comprises a series of curved members 80 attached to a rod 81. The curved members 80 are aligned in the direction of travel and are spaced across the width of the bale-forming zone 15. The rod 81 is attached at each of its ends to an angle member 82. A slide rod 83 extends upwardly and rearwardly from each angle member 82 through a sleeve 84, which is pivotally attached to one of the frame side members 3,4. A spring 85 circumscribes each slide rod 83 and extends between the angle member 82 and the sleeve 84. A stop 86 limits the downward movement of the slide rod 83 through the sleeve 84. Thus, the rod 81, with its attached curved members 80, may rotate forwardly and upwardly when pressed from below by the growing bale 11, as shown in FIGS. 15 and 16, but the spring 85 resists this movement—therefore the assembly 10 presses against the bale 11, forms and guides it, and also densifies it.

THE FLEXIBLE ELEMENTS

With reference to FIG. 4, a plurality of flexible $\frac{1}{2}$ inch steel cables 12 hang down at the entrance of the bale-forming zone 15 from a transverse beam 13 extending between the frame side members 3,4. The cables 12 are spaced along the transverse member 90 and extend down to lie along the swath 91 back to a point just in front of the pick-up drum 30.

The cables 12 are threaded through guides 92 attached to the forward ends of the curved members 80 of the arcuate arm assembly 10. These guides 92 are positioned with a view to dangling the cables 12 so that they are generally vertical when they first tangentially meet the bale 11.

It will be noted that the frame 2, the assemblies 6, 8, 9, and the cables 12 combine to define the open-bottomed bale-forming zone 15.

THE TWINE ASSEMBLY

With reference to FIGS. 11, 12 and 16, there is provided a twine assembly 16 for wrapping the bale 11 which is being formed, in lengths 18 of twine, once the bale has reached a pre-determined size. The twine assembly 16 is adapted to be contacted and driven by the rotating bale 11. When the bale 11 has been wrapped in twine, the assembly 16 is further capable of cutting the twine lengths 18 when the frame 2 is pivoted up to the discharge position, backed up, and then pivoted down toward the operating position.

More particularly, a pair of twine boxes 100, containing lengths 18 of twine, are mounted on the frame side members 3,4. A twine guide tube 102 extends across the entrance of the bale-forming zone 15 forward of the cables 12. The twine guide tube 102 is suitably secured at its ends to brackets 103 mounted on the side members 3,4. The twine guide tube 102 further has four openings 104 extending therethrough at spaced points along its length. Four separate lengths 18 of twine are threaded from the boxes 100 through the twine guide tube 102; each length 18 extends through one of the openings 104.

A shaft 106 is rotatably mounted on the brackets 103 forward of and below the twine guide tube 102. Surface portions 107 of the shaft 106 are knurled at points aligned with the twine guide tube openings 104. A spring steel arm 108 extends downwardly toward each of these knurled portions 107 from the twine guide tube 102. Each arm 108 carries a rubber roller 109 at its lower end which presses against the adjacent knurled position 107. Each length 18 of twine extends between a roller 109 and its underlying knurled portion 107.

The shaft 106 has discs 110 extending radially outward therefrom at spaced intervals along its length. When the bale 11 is almost full-size, the discs 110 contact it and are rotated thereby, in consequence of which the shaft 106 is rotated. This rotation causes the lengths 18 of twine to be drawn out of the openings 104 and to be fed downwardly.

The final component in the twine assembly 16 is a cutter bar 111 secured to and extending between the frame side members 3,4 in front of and below the shaft 106. The cutter bar 111 has cutting elements 112 aligned with the knurled portions 107. When the frame 2 is pivoted upwardly to the discharge position and backed away from the bound bale 11, as shown in FIG. 10, and then lowered as shown in FIG. 11, the cutting elements 112 are operative to cut the twine lengths 18.

OPERATION

In operation, the rotary baler 1 is first mounted on the front end of a power unit 5. The power take-off assembly 7 of the power unit 5 is connected to the sprocket and chain assembly 33 of the pick-up drum assembly 6 and the drive system of the baler 1 is set in motion. With the baler 1 horizontally positioned as shown in FIG. 1, the entire assembly is then advanced toward the swath to be baled.

Figure 13:
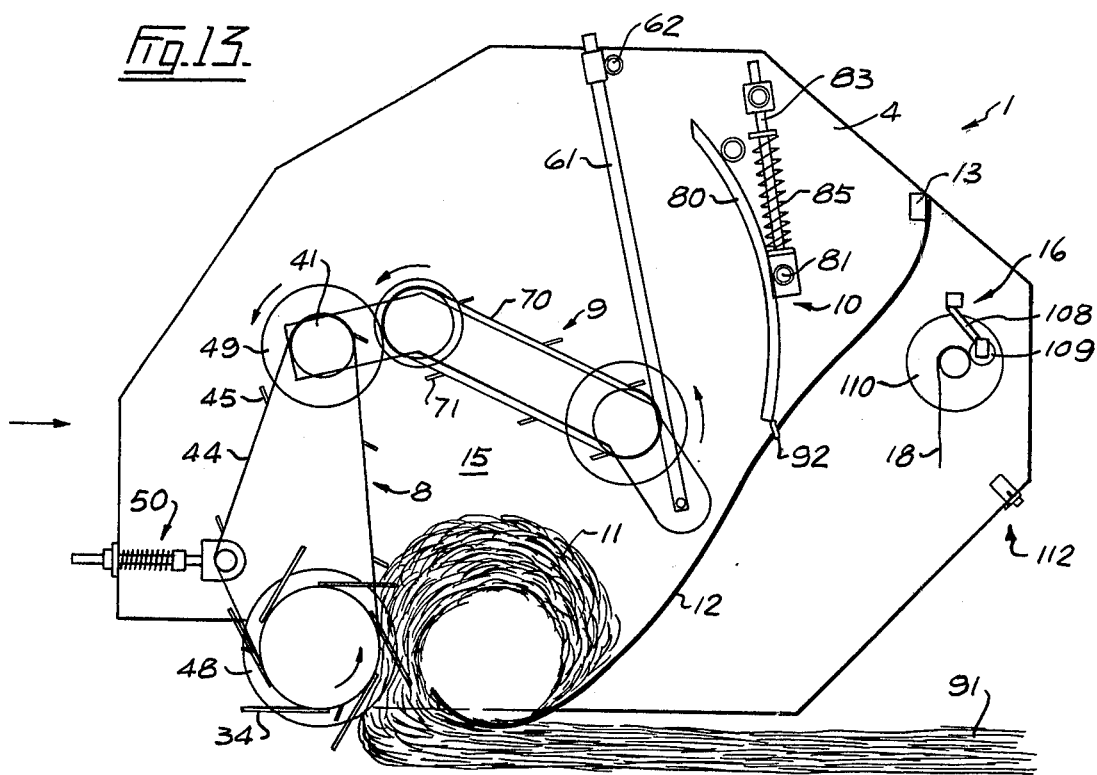

In the initial stage of baling, as seen in FIG. 13, the swath material is lifted by the pick-up teeth 34 and moved upwardly. As the pick-up teeth 34 retract between the belts 44 and belt-training discs 48, the material is engaged by the belt cogs 45 of the rear belt assembly 8. The cogs 45 lift the material upwardly a little further, but it cascades forwardly and downwardly by gravity along an arcuate path, as there is no formed bale present to prevent this. The cascading material contacts the trailing cables 12 and follows them downwardly and rearwardly along a curved path back toward the swath 91. In this manner a loose roll, which will form the central core of the final product, is created.

Figure 14:
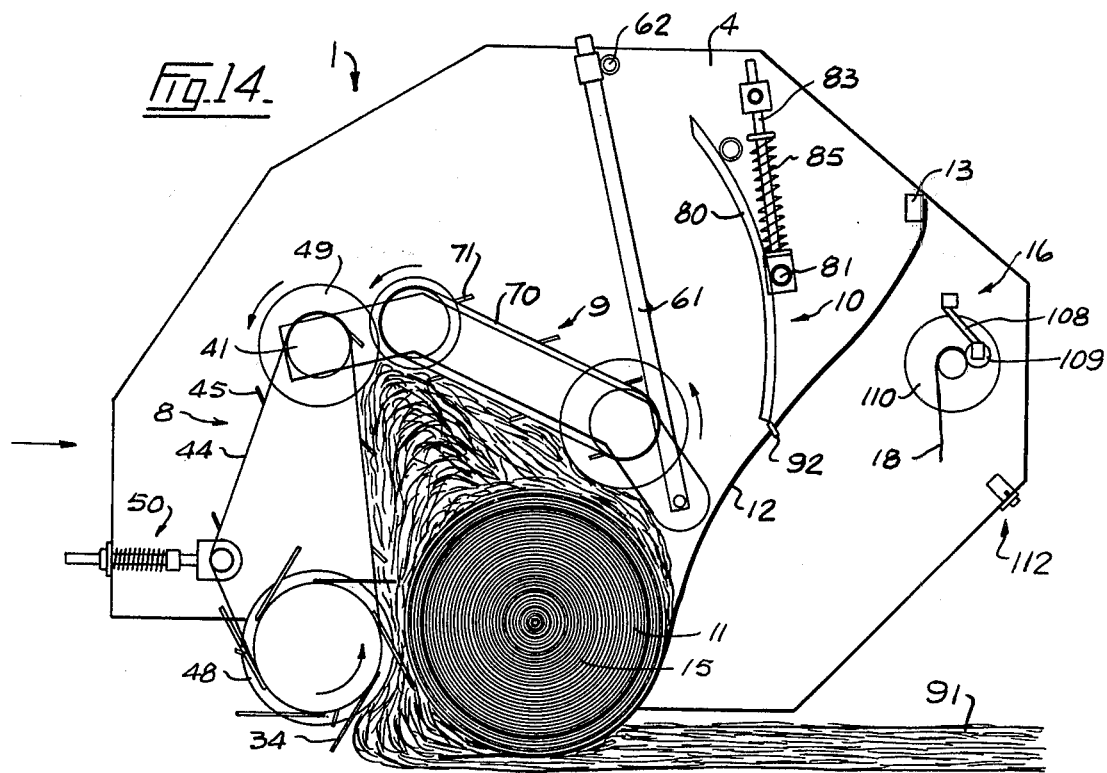

As the bale grows, the cogs 45 of the rear belt assembly move the material further upwardly until it contacts the deflecting discs 49. As the cogs retract between these discs 49, the material is dislodged and re-directed forwardly by the discs 49 where it is received by the upper belt assembly 9. At this stage, the upper belt assembly 9 is downwardly inclined. Thus the cogs 71 of this assembly 9 engage the material and move it forwardly and downwardly. The deflecting discs 49 at the forward end of the assembly 9 function to force the material downwardly. This stage of the operation is illustrated in FIG. 14.

It will be understood that the newly lifted material is being assimilated with the forming bale 11 and the belts are actively biasing the material along and rolling the bale along the ground. It will also be noted that, at this stage, due to the downward inclination of the upper belt assembly 9, the forming bale 11 is confined in a somewhat triangular bale-forming zone 15 and the "active" components (i.e. the pick-up, rear and upper belt assemblies 5, 8, 9) are acting on a considerable portion of the bale circumference. The "passive" components (at this stage the cables 12 and the ground) are acting on a lesser proportion of the bale circumference than is the case in the later stages. Finally, the main densification of the bale material which is occurring arises from the weight of the heavy upper belt assembly 9 pressing down on the bale 11.

As the bale 11 continues to grow, the upper belt assembly 9 pivots upwardly and the cables 12 act to confine an increasing proportion of the bale circumference. It will also be noted that an increasing portion 120 of the bale 11 is left unconfined between the cables 12 and the upper belt assembly 9. This stage of bale formation is illustrated in FIG. 15.

As the bale 11 approaches full size, the upper belt assembly 9 pivots to an upwardly inclined position, as shown in FIG. 16. At the same time, the bale 11 contacts the curved members 80 of the arcuate arm assembly 10. The curved members 80 fill the gap between the upper belt assembly 9 and the cables 12, thereby preventing spill over of the bale material at this point. In addition, the curved members 80 press against the bale 11 and form and density it. The degree of densification can be varied by adjusting the spring 85.

It will be noted that, in the later stage of bale growth, the "active" components work on only about ⅓ of the circumferential area of the bale 11 while the "passive" components (now including the arcuate arm assembly 10) confine the balance of this area.

It will also be noted that, throughout the formation of the bale 11, the cables 12 are trapped beneath the bale. The result is that the rotating bale 11 keeps trying to pull the cables 12 toward its rear and they are therefore kept in tension. Thus the cables 12 press tautly against the bale 11.

As the bale 11 reaches full size, it contacts the twin assembly 16 and automatically initiates wrapping. More particularly, the bale 11 contacts the discs 110 and causes them to rotate, thereby rotating the shaft 106. Rotation of the shaft 106 and its knurled portions 107 causes the lengths 18 of twine to be withdrawn from the twine boxes 100 and fed downwardly along the forward surface of the bale 11. The free ends of the lengths 101 become caught in the bale material and follow the bale 11 as it rotates. The rotating bale 11 tends to want to pull the twine faster than the twine is fed by the nip of the knurled portions 107 and the rubber rollers 109. Therefore the twine lengths extending between the bale and the nip are held in tension.

As the twine begins to be wrapped around the bale 11, the operator will normally drive the unit off the swath 91 to discharge the bale. This movement will put 3 or 4 wraps of twine on the bale.

The baler 1 is then pivoted up to the discharge position, by extending the swather cylinders 24, and backed up to disengage the baler from the bale 11, as shown in FIG. 18. This movement brings the cutting elements 112 into contact with the twine lengths 18. When the baler 1 is then pivoted downwardly, as shown in FIG. 19, toward the operating position, the cutting elements 112 sever the twine. The unit is then available to return to the swath to form a new bale.

FEATURES AND ADVANTAGES

Following are some of the advantages and features of the preferred form of the invention:

(1) The utilization of the flexible cables at the front end of the baler has made it possible to mount the baler in front of the power unit, thus making it self-propelled; this is because the cables confine the front end of the bale yet are adapted to permit the baler to be backed off the bale. By having a front-mounted, self-propelled unit, the operator can better see the swath as it is rolled up in front of him and can better guide the machine along it.

(2) The invention provides mechanical means capable of successfully forming the bale while rolling it at ground speed. Thus the prior art problem is avoided which arises from fully encasing the bale in belts and spinning it at relatively high speed to produce a uniform, high density bale. Applicant believes that leaf shatter is reduced by this design and much of the material, which would have been left on the ground by a full circumference baler, is retained in the bale by the present machine.

(3) The present baler utilizes "active" components to work on only a portion of the bale surface and combines these "active" components with "passive" components to encase the bale circumferential surface which is out of contact with the ground. The "active" elements are used where a positive drive is needed; the "passive" elements are used where gravity assists in maintaining motion. This arrangement contrasts with prior art commercial units which encase substantially all the circumferential surface of the bale in "active" elements. As a result of this change, the present baler is much simpler mechanically and costs less to build than the comparable prior art full circumference belt balers as best can be determined.

(4) By incorporating a pivoting upper belt assembly, the present baler has fairly concentrated "active" component input in the early stages of bale development. However, as the bale grows, a greater proportion of the bale circumferential surface is satisfactorily confined by the "passive" components. Thus the extent of "active" components, which are expensive to build and operate, is kept low.

(5) In contrast to the commercial prior art balers, which are commonly characterized by a relatively narrow inlet, through which the swath material enters the bale-forming zone, the present baler has a comparatively larger inlet and thus can successfully accommodate unusually large accumulations of feed material. This large inlet is mainly a result of the ground-rolling design of the baler.

(6) The baler incorporates an adjustable densifying mechanism. This is the arcuate arm assembly, which only comes into play once the bale is partly formed. Thus it is now possible to construct a bale having a porous core, which can more easily dry out than has heretofore been the case, surrounded by a denser outer shell. Since the densifying mechanism is adjustable, some tuning can be practised on the machine to assist it in coping with feeds having different characteristics.

(7) The baler incorporates rotating deflection discs which materially reduce the problem of fibrous material pile-ups at the belt assembly ends.

(8) Finally the baler incorporates an automatic twine wrapping and cutting means which does away with the need, inherent in prior art commercial rotary balers, of the operator having to dismount and manually operate the wrapping and cutting means.

(9) By providing a forwardly-directed baler, the swath material is not subjected to the pulverizing action arising from riding on the swath with the tractor tires, which is a characteristic of the pull type balers presently available. Thus leaf shatter and loss is reduced. In addition, of course, the forwardly-directed baler is much more comfortable to use, as the operator does not have to twist to the rear to watch the baling operation.

The embodiments of the invention in which an exclusive property or privilege is claimed are defined as follows:

1. A forwardly-directed ground-rolling rotary baler, comprising:
   a frame;
   means carried by the frame for lifting fibrous material from the ground and moving and guiding it upwardly and forwardly so that the material is biased along a generally arcuate path; and
   passive flexible means having an upper end attached to the frame and a free lower end which becomes trapped between the forming bale and the ground, said passive flexible means receiving the material from said means and confining it while guiding it in a downward and rearward direction;
   said combination of means being operative to form said fibrous material into a ground-supported cylindrical bale.

2. The baler as set forth in claim 1 wherein:
   the passive flexible means comprises a plurality of freely hanging cable means suspended from the frame at their upper ends and being of sufficient length so that their free ends become trapped between the forming bale and the ground.

3. The rotary baler as set forth in claim 1 wherein means are provided for wrapping the bale with twine, once it has reached a predetermined size, said wrapping means comprising:
   rotatable means carried by said frame and arranged to be rotated upon contacting the outer surface of the bale being formed once said bale has reached said pre-determined size;
   means, carried by said frame, for supplying lengths of twine to said rotatable means; and means for operatively engaging said lengths with said rotatable means whereby, when the latter is rotated, twine is fed downwardly to be trapped between the rotating bale and the ground, whereby the bale is operative to carry the twine in contact with it through one or more rotations to wrap the bale.

4. A forwardly-directed ground-rolling rotary baler comprising:

a frame which is pivotally movable between operating and discharge positions;

a pick-up drum assembly, carried by the frame, for lifting fibrous material from the ground;

a rear belt assembly, carried by the frame, for receiving the lifted fibrous material from the pick-up drum assembly and moving and guiding it upwardly;

an upper belt assembly, carried by the frame, for receiving the fibrous material from the rear belt assembly and moving and guiding said material forwardly; and a plurality of passive flexible cable elements, carried by the frame, for receiving the fibrous material from the upper belt assembly and confining it while guiding it in a downward and rearward direction;

said frame, assemblies and flexible cable elements combining to define an open-bottomed bale-forming zone, having a front entrance, and being operative to form said fibrous material into a ground-supported cylindrical bale within said zone, said flexible cable elements being positioned at the front entrance of the zone whereby a formed bale may be discharged through said entrance by pivoting the frame upwardly to the discharge position and backing up the frame to slide the flexible elements free.

5. A ground-rolling rotary baler, for use on the front of a self-propelled power unit, comprising: ;

a frame which is mountable on the power unit for movement between an operating position and a discharge position;

first driven means, supported by the rear end of the frame and connectable to the power unit for actuation thereby, for lifting fibrous material from the ground;

second driven means, supported by the frame and connectable to the power unit for actuation thereby, for receiving the lifted fibrous material from the first driven means and moving and guiding it upwardly and then forwardly along a generally arcuate path, said second driven means being operable to contact a portion of the rear and upper circumferential sections, of the bale being formed, which are out of contact with the ground;

a plurality of flexible elements for passively guiding and confining said bale by acting on at least part of the forward circumferential section of said bale which is out of contact with the ground and the first and second means, said flexible elements being connected to a member extending transverse of the frame and arranged to hand freely in spaced relation, said frame, first and second driven means, and flexible elements combining to form an open-bottomed bale-forming zone having a front entrance, said flexible elements being positioned across said front entrance and further being of sufficient length so that their free ends may be trapped between the growing bale and the ground.

6. The rotary baler as set forth in claim 5 wherein:

the first driven means comprises a rotatable pick-up drum assembly; and the second driven means comprises:

a generally vertical rear belt assembly for receiving lifted fibrous material and moving and guiding it in an upward direction, and an upper belt assembly for moving and guiding fibrous material, said upper belt assembly being pivotally suspended from the frame for movement in a vertical plane and extending forwardly from the upper end of the rear belt assembly.

7. The rotary baler as set forth in claim 6 wherein the flexible elements act on a circumferential section of the bale surface spaced forwardly of that section being acted on by the second driven means;

said rotary baler further comprising:

third means, pivotally supported by the frame, for engaging the forming bale, between those circumferential sections being acted on by the second driven means and the flexible elements, when said bale has reached a pre-determined size, and for guiding and confining said bale to assist in its formation.

8. The rotary baler as set forth in claim 7 wherein the third means comprises:

an arcuate arm assembly extending in the direction of travel; and spring means, pivotally connected at one end with the frame and secured at the other end with the arcuate arm assembly, for biasing the assembly into pressing engagement with the forming bale.

9. The rotary baler as set forth in claims 5,6 or 7 wherein each flexible element is a length of steel cable.

10. A ground-rolling rotary baler, for use on the front of a self-propelled power unit, comprising:

(a) a frame comprising interconnected side members, said frame being pivotally mountable on the power unit for movement between an operating position and a discharge position;

(b) a pick-up drum assembly, rotatably supported by the side members and connectable to the power unit for rotation thereby, said assembly comprising a driven drum having axially and circumferentially spaced pick-up teeth, whereby, upon rotation of the drum, the pick-up teeth are operative to lift fibrous material from the ground;

(c) a generally vertical rear belt assembly comprising:

an upper roller unit, rotatably supported by the side members above the pick-up drum assembly and connectable to the power unit for rotation thereby, a first series of transversely spaced endless belts extending around the pick-up drum, between the rows of pick-up teeth, and the roller unit, and a plurality of fibrous material-engaging cogs spaced along the belts, whereby, when the belts are driven, the cogs and belts function to receive the lifted fibrous material from the pick-up assembly and move and guide it upwardly, thereby incorporating the material with the growing bale and assisting to rotate and form the bale;

(d) an upper belt assembly extending forwardly from the upper end of the rear belt assembly and comprising:

a pair of forwardly extending carrier arms having their rear ends pivotally connected with the frame for rotating movement in a generally vertical plane, means for limiting the rotating movement of the carrier arms, a rotatable first roller extending transversely between the carrier arms adjacent their rear ends and connectable to the power unit for rotation thereby, a second roller extending transversely between the carrier arms adjacent their front ends, a second series of transversely spaced endless belts extending around the first and second rollers, and a plurality of fibrous material-engaging cogs spaced along said belts, whereby when said second series of moving belts contact the growing bale, the cogs and belts function to assist in rotating and forming the growing bale at its upper surface.

(e) a plurality of flexible elements for passively guiding and confining said bale by acting on at least part of the forward circumferential section of said bale which is out of contact with the ground and the rear and upper belt assemblies, said flexible elements being connected to a member extending transverse of the frame and arranged to hang freely in spaced relation, said frame, pick-up drum, and upper belt assemblies, and said flexible elements combining to form an open-bottomed bale-forming zone having a front entrance, said flexible elements being positioned across said front entrance and further being of sufficient length so that the free ends of said elements may be trapped between the growing bale and the ground; and (f) said pick-up drum, rear and upper belt assemblies and flexible elements combining when operative to form said fibrous material into a ground-supported cylindrical bale.

11. The rotary baler as set forth in claim 10 comprising:

means axially spaced along the pick-up drum for training the belts of the rear belt assembly;

first deflector means axially spaced along the upper roller unit for training the belts of the rear belt assembly and deflecting the upwardly moving fibrous material to the upper belt assembly;

means axially spaced along the first roller for training the belts of the upper belt assembly; and second deflector means axially spaced along the second roller to deflect downward fibrous material being advanced by the belts of the upper belt assembly.

12. The rotary baler as set forth in claims 10 or 11 wherein:

each flexible element is a length of steel cable which acts on a circumferential section of the bale surface spaced forwardly of that section being acted on by the upper belt assembly, said rotary baler further comprising:

third means, pivotally supported by the frame, for engaging the forming bale, between those circumferential sections being acted on by the second driven means and the flexible elements, when said bale has reached a pre-determined size, and for guiding and compressing said bale to assist in its formation.

13. The rotary baler as set forth in claims 5,6 or 7 comprising:

means for wrapping the bale being formed with twine once it has reached a pre-determined size, said means being contacted and driven by the rotating bale once the latter has reached said size.

14. The rotary baler as set forth in claim 10 comprising:

means for wrapping the bale being formed with twine once it has reached a pre-determined size, said means being contacted and driven by the rotating bale once the latter has reached said size.

15. The rotary baler as set forth in claim 14 wherein the wrapping means comprises:

rotatable means, positioned at the front end of the bale-forming zone, arranged to be rotated upon contacting the outer surface of the bale being formed;

means for supplying lengths of twine to said rotatable means;

means for pressing said lengths against said rotatable means whereby, when the latter is rotated, twine is fed downwardly to be trapped between the rotating bale and the ground, thereby tensioning the twine between the bale and the pressing means, whereby said bale is operative to carry the twine in contact with it through one or more rotations to wrap the bale; and means carried by the frame operative, when the frame is pivoting to the discharge position, to cut the twine between the pressing means and the bale.

16. A method of forming a cylindrical bale from a swath of fibrous material comprising:

lifting fibrous material upward from the ground;

moving and guiding the material upwardly and then forwardly with belt means;

then flexibly confining the material as it drops with passive flexible means which become trapped between the forming bale and the ground, so that it is downwardly and rearwardly directed, until the material completes a rotation and engages the remaining swath, whereby the bale is gradually formed as further fibrous material is added in this manner by a combination of active and passive mechanical parts.

17. In a ground-rolling rotary baler wherein a bale is formed in an open-bottomed bale-forming zone by active elements acting on the rearward circumferential surface of the bale, the improvement comprising:

a plurality of flexible cable elements for passively guiding and confining said bale by acting on at least part of the forward circumferential surface of said bale which is out of contact with the ground and the active elements, said flexible elements being arranged to hang freely in spaced relation at the front end of the zone, said flexible elements being of sufficient length so that their free ends may be trapped between the growing bale and the ground.

18. In a ground-rolling rotary baler, having a frame, wherein fibrous material is formed into a bale by rolling it along the ground, the improvement comprising means for automatically wrapping the bale with twine, once it has reached a pre-determined size, said means comprising:

rotatable means carried by said frame and arranged to be rotated upon contacting the outer surface of the bale being formed once said bale has reached said pre-determined size;

means, carried by said frame, for supplying lengths of twine to said rotatable means; and means for operatively engaging said lengths with said rotatable means whereby, when the latter is rotated, twine is fed downwardly to be trapped between the rotating bale and the ground, whereby the bale is operative to carry the twine in contact with it through one or more rotations to wrap the bale.

19. The improvement as set forth in claim 18 comprising:
means, carried by the frame, for cutting the twine, extending between the bale and the automatic wrapping means, when actuated.

20. A rotary baler as set forth in claim 4 wherein:
said upper belt assembly is pivotally mounted at its rear end whereby it may rotate in a vertical plane, said upper belt assembly including means for limiting the extent of its downward rotation.

21. The rotary baler as set forth in claim 20 wherein:
each of the rear and upper belt assemblies comprise a series of driven endless belts spaced across the width of the relevant assembly, each such belt carrying material-engaging cogs spaced along the length of its working face.

22. The rotary baler as set forth in claim 21 comprising:
an arcuate arm assembly, carried by the frame, for passively engaging the forming bale, between those circumferential sections being acted on by the upper belt assembly and the cable elements, when said bale has reached a pre-determined size, and for guiding and confining said bale to assist in its formation, said arcuate arm assembly comprising spring means for biasing the assembly into pressing engagement with the forming bale.

23. The rotary baler as set forth in claim 22 comprising:
deflector means, associated with the upper end of the rear belt assembly, for deflecting the upwardly moving fibrous material to the upper belt assembly.

* * * * *